US012687685B2

(12) United States Patent (10) Patent No.: US 12,687,685 B2
Nagashima et al. (45) Date of Patent: Jul. 21, 2026

(54) OPTICAL MODULE

(71) Applicant: FURUKAWA ELECTRIC CO., LTD., Tokyo (JP)

(72) Inventors: Kazuya Nagashima, Tokyo (JP); Atsushi Izawa, Tokyo (JP); Atsushi Kaji, Tokyo (JP); Go Kobayashi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 810 days.

(21) Appl. No.: 18/059,054

(22) Filed: Nov. 28, 2022

(65) Prior Publication Data

US 2023/0244047 A1 Aug. 3, 2023

(30) Foreign Application Priority Data

Feb. 2, 2022 (JP) ................................. 2022-014575

(51) Int. Cl.
*G02B 6/42* (2006.01)
(52) U.S. Cl.
CPC ......... *G02B 6/4271* (2013.01); *G02B 6/4244* (2013.01); *G02B 6/4257* (2013.01); *G02B 6/4269* (2013.01)
(58) Field of Classification Search
None
See application file for complete search history.

(56) References Cited

U.S. PATENT DOCUMENTS

2014/0192832 A1* 7/2014 Shih ........................ H01L 25/04
372/44.01
2020/0333639 A1 10/2020 Hirayama

FOREIGN PATENT DOCUMENTS

JP 2001-242499 A 9/2001
JP 2007-19411 A 1/2007
JP 2013-232468 A 11/2013
JP 2015-115457 A 6/2015
JP 2020-178117 A 10/2020
WO WO 2021/153462 A1 8/2021

OTHER PUBLICATIONS

Japanese Office Action issued Jul. 22, 205, in Japanese Patent Application No. 2022-014575, 9 pages.

* cited by examiner

*Primary Examiner* — Jerry Rahll
(74) *Attorney, Agent, or Firm* — Oblon, McClelland, Maier & Neustadt, L.L.P.

(57) ABSTRACT

An optical module includes: a casing in which light is propagated; a heating portion; a device arranged inside the casing and configured to change, when heated, characteristics of the light propagated inside the casing; and a first member thermally connected to the heating portion and the device, the first member including a hollow arranged in a heat transfer path from the heating portion to the device and configured to prevent convective heat transmission to an inside of the casing.

24 Claims, 9 Drawing Sheets

OPTICAL MODULE

This application claims the benefit of priority from Japanese Patent Application No. 2022-014575 filed on Feb. 2, 2022, the entire contents of which are incorporated herein by reference.

BACKGROUND

The present disclosure relates to an optical module.

In the related art, an optical module that includes an optical device, an optical component, a temperature controller, and the like and that propagates light in a casing is known (for example, Japanese Laid-open Patent Publication No. 2020-178117). Examples of the optical device include a photodiode and a modulator.

SUMMARY

The known optical module may include a heating part, such as a modulator driver or a chip on submount, inside the casing. In this case, if the optical device or the temperature controller receives heat that is generated by the heating part, characteristics of light that is propagated inside the casing may be changed, which may eventually lead to a change of optical characteristics of the optical module. Therefore, blocking the heat from the heating part to the optical device and the temperature controller is one of important tasks.

There is a need for an optical module with an improved and novel configuration that makes it possible to prevent heat transfer from a heating part to a device that, when heated, affects characteristics of light that is propagated inside a casing, for example.

According to one aspect of the present disclosure, there is provided an optical module including: a casing in which light is propagated; a heating portion; a device arranged inside the casing and configured to change, when heated, characteristics of the light propagated inside the casing; and a first member thermally connected to the heating portion and the device, the first member including a hollow arranged in a heat transfer path from the heating portion to the device and configured to prevent convective heat transmission to an inside of the casing.

DETAILED DESCRIPTION

Exemplary embodiments will be disclosed below. Configurations of the embodiments described below and functions and results (effects) achieved by the configurations are mere examples. The present disclosure may be embodied by other than the configurations disclosed in the embodiments below. Furthermore, according to the present disclosure, it is possible to achieve at least one of effects (including derivative effects) obtained by the configurations.

The plurality of embodiments described below include the same components. Therefore, according to the configuration of each of the embodiments, it is possible to achieve the same functions and effects based on the same configuration. In addition, in the following, the same components are denoted by the same reference symbols, and repeated explanation may be omitted in some cases.

In the present specification, ordinal numbers are assigned to distinguish members, parts, directions, and the like for the sake of convenience, and do not indicate priority or sequential order.

Furthermore, in each of the drawings, an X-direction is indicated by an arrow X, a Y-direction is indicated by an arrow Y, and a Z-direction is indicated by an arrow Z. The X-direction, the Y-direction, and the Z-direction cross one another and are perpendicular to one another.

Figure 1:
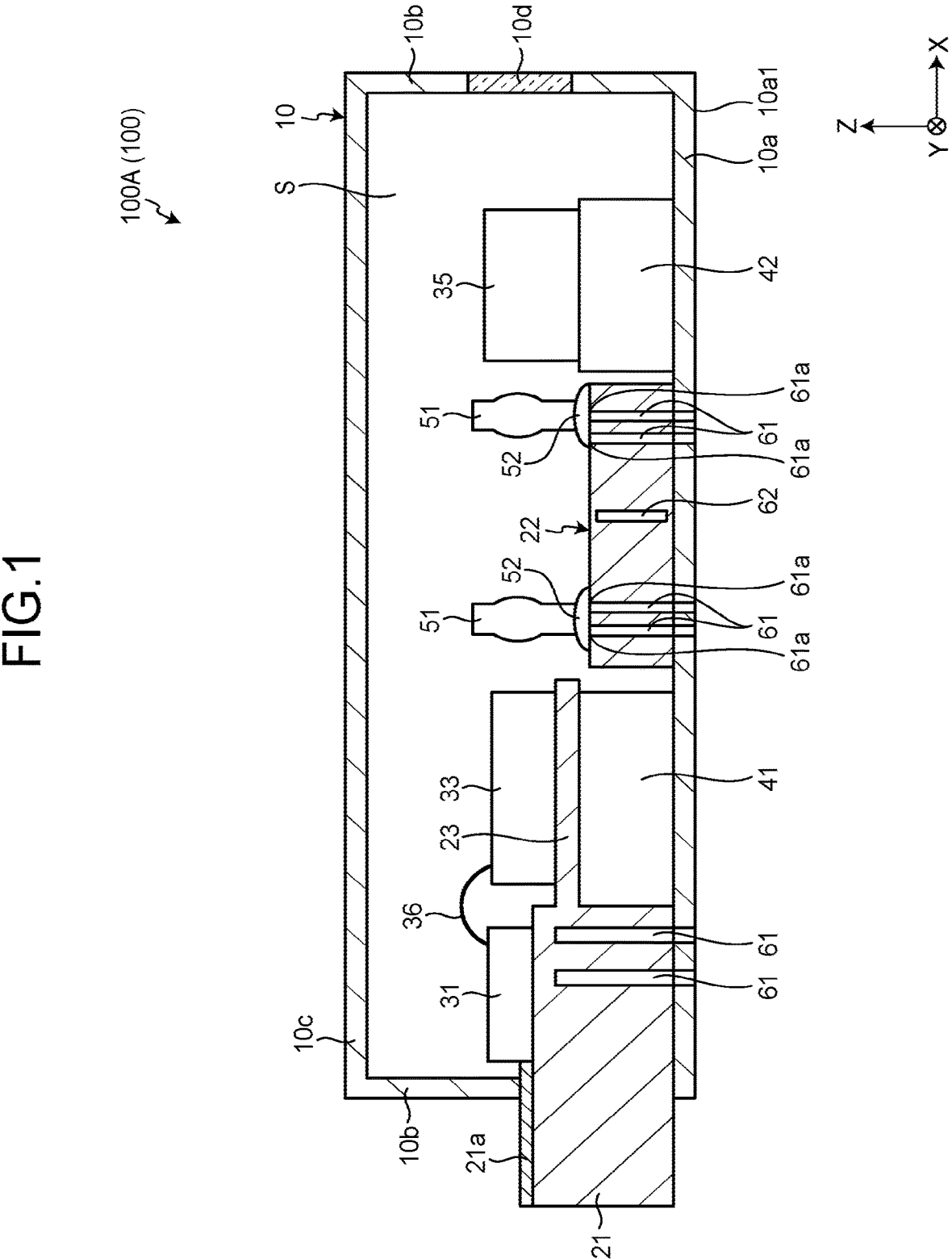
FIG. 1 is an exemplary and schematic side view (partial cross-sectional view) illustrating an internal configuration of an optical module according to a first embodiment.
Figure 2:
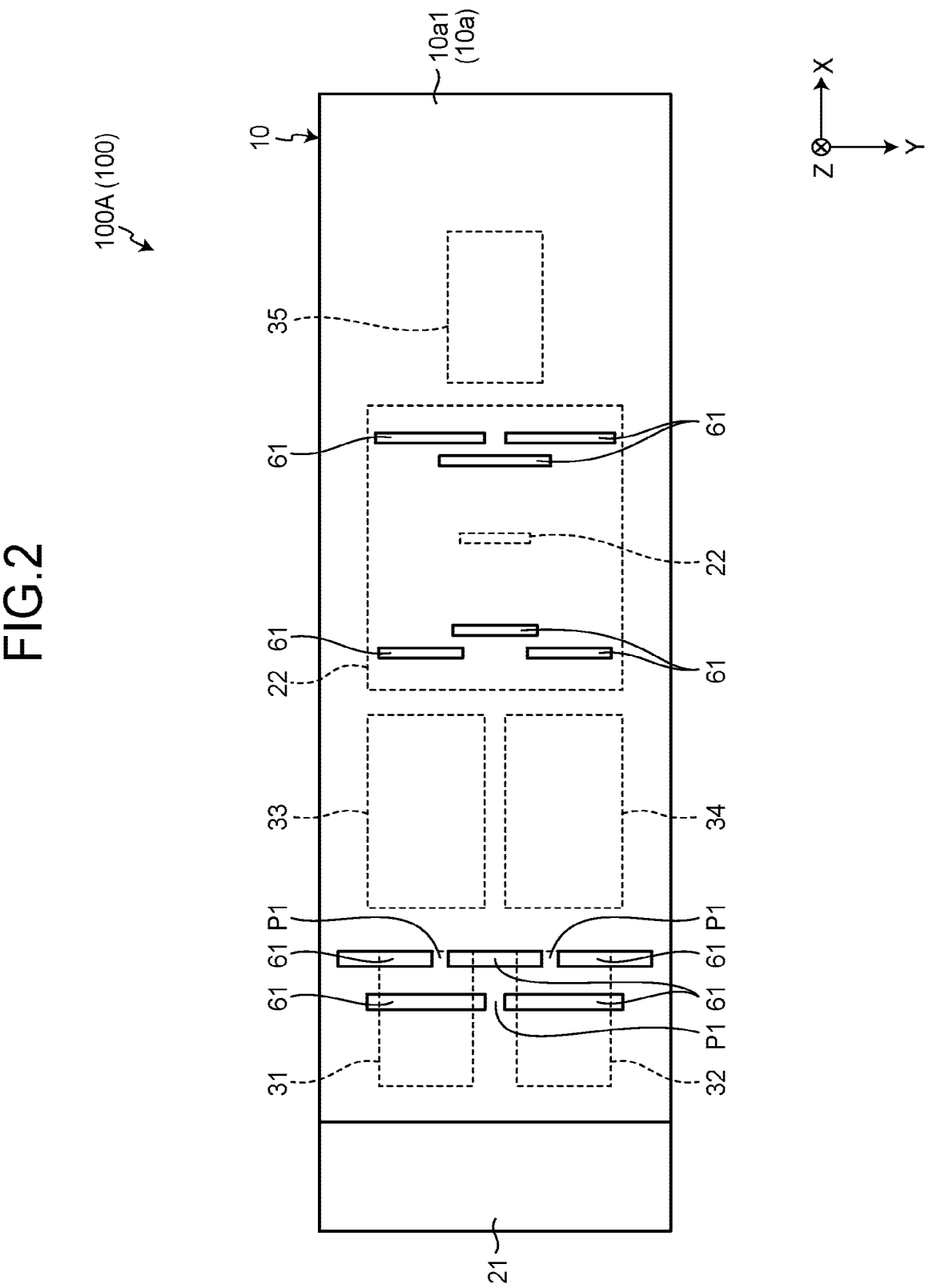
FIG. 2 is an exemplary and schematic plan view of a back surface of the optical module according to the first embodiment.

FIG. 1 is a side view illustrating an internal configuration of an optical module 100A (100) according to a first embodiment. Further, FIG. 2 is a plan view of a back surface of a bottom wall 10a of a casing 10 of the optical module 100A. Meanwhile, the optical module 100 has the same configuration as an optical module that is disclosed in, for example, PCT/JP2021/002326 (WO-A1-2021/153462).

As illustrated in FIG. 1, the optical module 100A includes the casing 10, a feedthrough 21, a support base 22, and an intermediate member 23.

The casing 10 includes the bottom wall 10a, a peripheral wall 10b, and a top wall 10c. The bottom wall 10a has an approximately quadrilateral plate shape. The bottom wall 10a is spread so as to cross and be approximately perpendicular to the Z-direction, and extends in the X-direction and the Y-direction. The peripheral wall 10b extends approximately along the Z-direction from an edge of the bottom wall 10a and has an approximately constant thickness. The peripheral wall 10b may also be referred to as a side wall. The top wall 10c has an approximately quadrilateral plate shape. Further, the top wall 10c is spread so as to cross and be perpendicular to the Z-direction, and extends in the X-direction and the Y-direction.

A window member 10d for transmitting light between inside and outside of the casing 10 (storage space S) is arranged in the peripheral wall 10b. In the casing 10, light that is emitted from the inside of the casing 10 to the outside of the casing 10, light that is input from the outside of the casing 10 to the inside of the casing 10, light that travels through a device or a component inside the casing 10, or the like is propagated.

The bottom wall 10a may be made of a material with high thermal conductivity, such as copper tungsten (CuW), copper molybdenum (CuMo), or aluminum oxide ($Al_2O_3$).

Further, the peripheral wall 10*b* and the top wall 10*c* may be made of a material with a low thermal expansion coefficient, such as iron-nickel-cobalt (Fe—Ni—Co) alloy or aluminum oxide ($Al_2O_3$).

A periphery of the top wall 10*c* is also referred to as a cap, and overlaps, in the Z-direction, with an edge of the peripheral wall 10*b* in the Z-direction. By bonding the periphery of the top wall 10*c* and the edge of the peripheral wall 10*b* in the Z-direction, the storage space S for storing a component and a device is formed inside the casing 10. Gas, such as inert gas or air, is stored in the storage space S (in the casing 10). Meanwhile, the storage space S may be hermetically sealed.

The feedthrough 21 includes a conductor 21*a* and an insulating portion, and penetrates through a part of the peripheral wall 10*b* of the casing 10. The conductor 21*a* of the feedthrough 21 may be made of a metal material with high conductivity, such as copper series metal. Further, the insulating portion of the feedthrough 21 may be made of an insulator, such as ceramic. A boundary between the feedthrough 21 and the casing 10 is insulated and hermetically sealed.

Furthermore, the feedthrough 21 supports components, such as a modulator driver 31 and a transimpedance amplifier 32 (see FIG. 2).

As illustrated in FIG. 1, the support base 22 is fixed on the bottom wall 10*a* of the casing 10, has an approximately constant height in the Z-direction, and is spread so as to cross and be approximately perpendicular to the Z-direction. The support base 22 supports an optical component, such as lenses 51. The lenses 51 are bonded and fixed to the support base 22 by adhesive 52. Meanwhile, the support base 22 may be configured as a multilayer wiring board.

The intermediate member 23 is interposed between a thermoelectric cooler (TEC) 41 (cooling system), a modulator 33, a coherent mixer 34 (see FIG. 2), a photodiode serving as a light receiver, and the like. The TEC 41 includes a Peltier device, electrically adjusts temperature of the modulator 33, the coherent mixer 34, the photodiode, and the like by operation of the Peltier device, and may also be referred to as a temperature control mechanism. The intermediate member 23 has a plate-like shape and may be made of a material with high thermal conductivity. Further, the modulator 33 is electrically connected to the modulator driver 31 with a bonding wire 36.

Furthermore, a TEC 42 that is different from the TEC 41 is arranged on the bottom wall 10*a*, and a chip on submount 35 (light emitting unit) is arranged on the TEC 42 on the opposite side of the bottom wall 10*a*. The TEC 42 has approximately the same configuration as the TEC 41 although a target object for which temperature is to be adjusted is different. Moreover, the chip on submount 35 includes a submount and a light emitting device, such as a semiconductor laser device, that is mounted on the submount.

The components, such as the modulator driver 31, the transimpedance amplifier 32, the modulator 33, the coherent mixer 34, the chip on submount 35, the TECs 41 and 42, and the lenses 51, are located in the casing 10. Meanwhile, an optical component (not illustrated), such as a mirror, a beam combiner, a beam splitter, or an optical isolator, may be housed in the casing 10 in addition to the components as described above.

The modulator 33, the coherent mixer 34, the chip on submount 35, the TECs 41 and 42, and the like among the components housed in the casing 10 are devices (hereinafter, referred to as first devices) that may change characteristics (for example, a wavelength or the like) of light propagated in the casing 10 when the components are heated. Meanwhile, the first devices as described above may include, for example, a heating portion, a wavelength locker serving as a wavelength detector, a vertical cavity surface emitting laser (VCSEL), and an electro-absorption modulator-integrated laser diode (EML).

Furthermore, the modulator driver 31, the transimpedance amplifier 32, the chip on submount 35, and the like electrically operate and generate heat. The modulator driver 31, the transimpedance amplifier 32, and the chip on submount 35 are examples of heating parts that are located in the casing 10.

In the optical module 100 configured as described above, if the heat generated by the heating parts is transmitted to the first devices, characteristics of light that is propagated in the casing 10 may be changed, which may eventually lead to a change of optical characteristics of the optical module 100. To cope with this, in the present embodiment, hollows 61 and 62 are arranged in members (hereinafter, referred to as first members), such as the casing 10, the feedthrough 21, and the support base 22, that are thermally connected to the heating parts and the first devices and that serve as a path for transmitting heat (hereinafter, referred to as a heat transfer path). The hollows 61 and 62 are arranged in the first members so as to be interposed in the heat transfer path from the heating parts to the first devices, and therefore, it is possible to, by the hollows 61 and 62, prevent heat transmission in the heat transfer path. In the present embodiment, the hollows 61 and 62 are at least partly located in the casing 10 (in the storage space S). The hollows 61 may be formed at the time of manufacturing the members in which the hollows 61 are arranged, or may be formed after the optical module 100 is assembled. The hollow 62 is formed at the time of manufacturing the member in which the hollow 62 is arranged. Meanwhile, the member, such as the feedthrough 21, that supports the first device among the first members is one example of a support member, and the member, such as the casing 10, that is fixed to the support member is one example of a fixing member.

As illustrated in FIG. 1, the hollows 61 are arranged in the feedthrough 21 and the bottom wall 10*a*. The hollows 61 have predetermined widths in the X-direction, extend in the Y-direction and the Z-direction, and are arranged in a slit manner. Further, the hollows 61 are arranged across the feedthrough 21 and the bottom wall 10*a*, penetrate through the bottom wall 10*a*, and are opened at a back surface 10*a*1 of the bottom wall 10*a*. In other words, the hollows 61 may also be referred to as bottomed holes. With the hollows 61, it is possible to prevent heat from being transferred from the modulator driver 31 or the transimpedance amplifier 32 as a heat generator to the modulator 33, the coherent mixer 34, the TEC 41, and the like via the feedthrough 21 and the bottom wall 10*a*.

Here, if the hollows 61 are opened inside the storage space S, gas in the hollows 61 is heated by heat transfer by the feedthrough 21 or the bottom wall 10*a*, so that heat is transmitted to the inside of the storage space S by convective heat transfer of the gas, the first devices in the storage space S are heated, and a heat shielding effect by the hollows 61 may, consequently, be reduced. To cope with this, in the present embodiment, the hollows 61 are arranged so as not to communicate with the storage space S, in other words, such that convective heat transfer from the hollows 61 to the storage space S (inside of the casing 10) is prevented.

Furthermore, the hollows 61 are opened at the back surface 10*a*1 of the bottom wall 10*a*. In other words, the hollows 61 are opened to the outside of the casing 10. With this configuration, it is possible to cause heat to flow out of the casing 10 via the opening at the side of the back surface 10*a*1, in accordance with the convective heat transfer of the gas that is heated inside the hollows 61. Consequently, it is possible to prevent heat from staying in the hollows 61 or eventually in the casing 10, and it is possible to improve the effect of preventing heat transfer by the hollows 61.

Moreover, as illustrated in FIG. 2, in the feedthrough 21, the plurality of hollows 61 are arranged in series at intervals in the X-direction and in parallel at intervals in the Y-direction. In some cases, a wiring path may be arranged in the feedthrough 21, and if the single large hollow 61 is arranged, routing of the wiring path may become difficult. In this respect, in the present embodiment, it is possible to prevent heat transfer by the plurality of hollows 61 and relatively easily ensure the wiring path by arranging the wiring path in portions (hereinafter, referred to as first portions P1) between the plurality of hollows 61.

Furthermore, in the feedthrough 21, the different hollow 61 that is deviated in the X-direction from the portion between the two hollows 61 that are adjacent to each other at an interval in the Y-direction is arranged. In other words, the plurality of hollows 61 are arranged in an alternating manner. The first portions P1 serve as a heat transfer path, and therefore, if the plurality of first portions P1 are arrayed in the X-direction, the heat transfer path is shortened, so that heat is easily transmitted. In this respect, in the present embodiment, the plurality of hollows 61 and the first portions P1 are arranged in an alternating manner, so that it is possible to increase the heat transfer path via the first portions P1 and it is possible to further prevent heat transfer via the feedthrough 21 and the bottom wall 10*a*.

Moreover, as illustrated in FIG. 1, the hollows 61 are arranged even in the support base 22 and the bottom wall 10*a*. The hollows 61 are arranged across the support base 22 and the bottom wall 10*a*, penetrate through the bottom wall 10*a*, and are opened at the back surface 10*a*1 of the bottom wall 10*a*. In other words, the hollows 61 may also be referred to as bottomed holes. With the hollows 61, it is possible to prevent heat from being transferred from the chip on submount 35 that is the heating part to the modulator 33, the coherent mixer 34, the TEC 41, and the like via the support base 22 and the bottom wall 10*a*. Furthermore, the hollows 61 are located in a heat transfer path between the TECs 41 and 42. Therefore, it is possible to prevent, by the hollows 61, heat from being transferred between the TEC 41 and the TEC 42 via the support base 22 and the bottom wall 10*a*. Moreover, each of the TECs 41 and 42 includes a cooling part and a heating part. Therefore, with the hollows 61, it is possible to prevent heat from being transferred from the heating parts of the TECs 41 and 42 to the modulator 33, the coherent mixer 34, the chip on submount 35, and the like via the support base 22 and the bottom wall 10*a*.

Furthermore, in the support base 22, opening portions 61*a* toward the inside of the storage space S, that is, toward the inside of the casing 10 are arranged in the hollows 61, but the opening portions 61*a* are covered and blocked by at least one of the lenses 51 and the adhesive 52. With this configuration, it is possible to prevent reduction of the heat shielding effect of the hollows 61 due to convective heat transmission from the hollows 61 to the storage space S (inside the casing 10). Moreover, in this case, it is possible to form the hollows 61 as through holes, so that, in some cases, it may be possible to more easily form the hollows 61 as compared to a case in which the hollows 61 are formed as partly-bottomed holes. The lenses 51 and the adhesive 52 are one example of a cover member. Furthermore, the lenses 51 are one example of optical components or components that are mounted on the first members.

Moreover, the hollow 62 that is closed in the support base 22 is also arranged in the support base 22. In other words, the hollow 62 is a closed space. The hollow 62 has a predetermined width in the X-direction, extends in the Y-direction and the Z-direction, and are arranged in a slit manner. Even the hollows 62 are arranged so as not to communicate with the storage space S, in other words, such that convective heat transfer from the hollow 62 to the storage space S (inside of the casing 10) is prevented. Therefore, it is possible to achieve, by the hollow 62, the same functions and effects as those of the hollows 61.

Thus, as described above, in the present embodiment, the hollows 61 and 62 are arranged in the heat transfer path of the first members that are thermally connected the heating parts and the first devices. Consequently, according to the present disclosure, it is possible to, by the hollows 61 and 62, prevent heat transmission from the heating parts to the first devices, so that it is possible to prevent a change of the characteristics of light that is propagated inside the casing 10 and an eventual change of the optical characteristics of the optical module 100 due to the heat generated by the heating parts.

Meanwhile, the hollows 61 and 62 need not be completely isolated from the storage space S, but the hollows 61 and 62 may communicate with the storage space S within a range in which the characteristics of light is not substantially affected by an increase in the temperature of the first devices due to convective heat transfer from the hollows 61 and 62. In other words, the lenses 51 (components or optical components) or the adhesive 52 may partly close the opening portions 61*a* of the hollows 61 in the range as described above.

Figure 3:
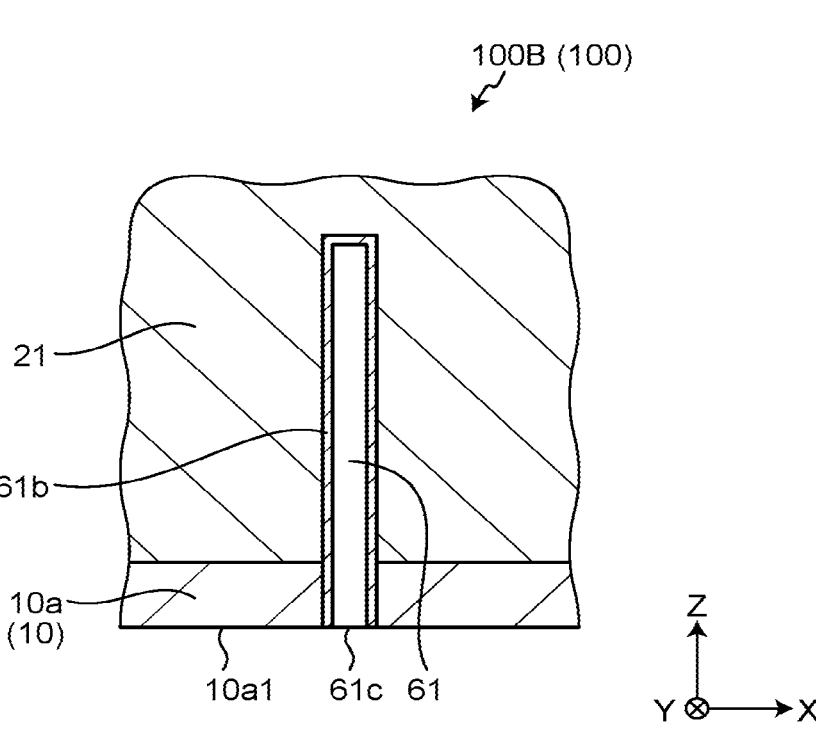
FIG. 3 is an exemplary and schematic partial cross-sectional view of an optical module according to a second embodiment.

FIG. 3 is a cross-sectional view of a peripheral portion of the hollow 61 that is arranged in an optical module 100B (100) according to a second embodiment. Even in the present embodiment, similarly to the first embodiment as described above, the hollow 61 is arranged across the feedthrough 21 and the bottom wall 10*a*. Even in the present embodiment, it is possible to achieve the same effects based on the same configuration as the first embodiment.

However, in the present embodiment, a heat transfer layer 61*b* with higher thermal conductivity than the feedthrough 21 is arranged on an inner surface of the hollow 61. Furthermore, the heat transfer layer 61*b* is extended to an opening portion 61*c* of the hollow 61 that is arranged at the back surface 10*a*1 of the bottom wall 10*a* of the casing 10. With this configuration, it is possible to improve heat dissipation from the peripheral portion of the hollow 61 to the outside of the casing 10, so that it is possible to further prevent heat transmission from the heating parts to the first devices.

Figure 4:
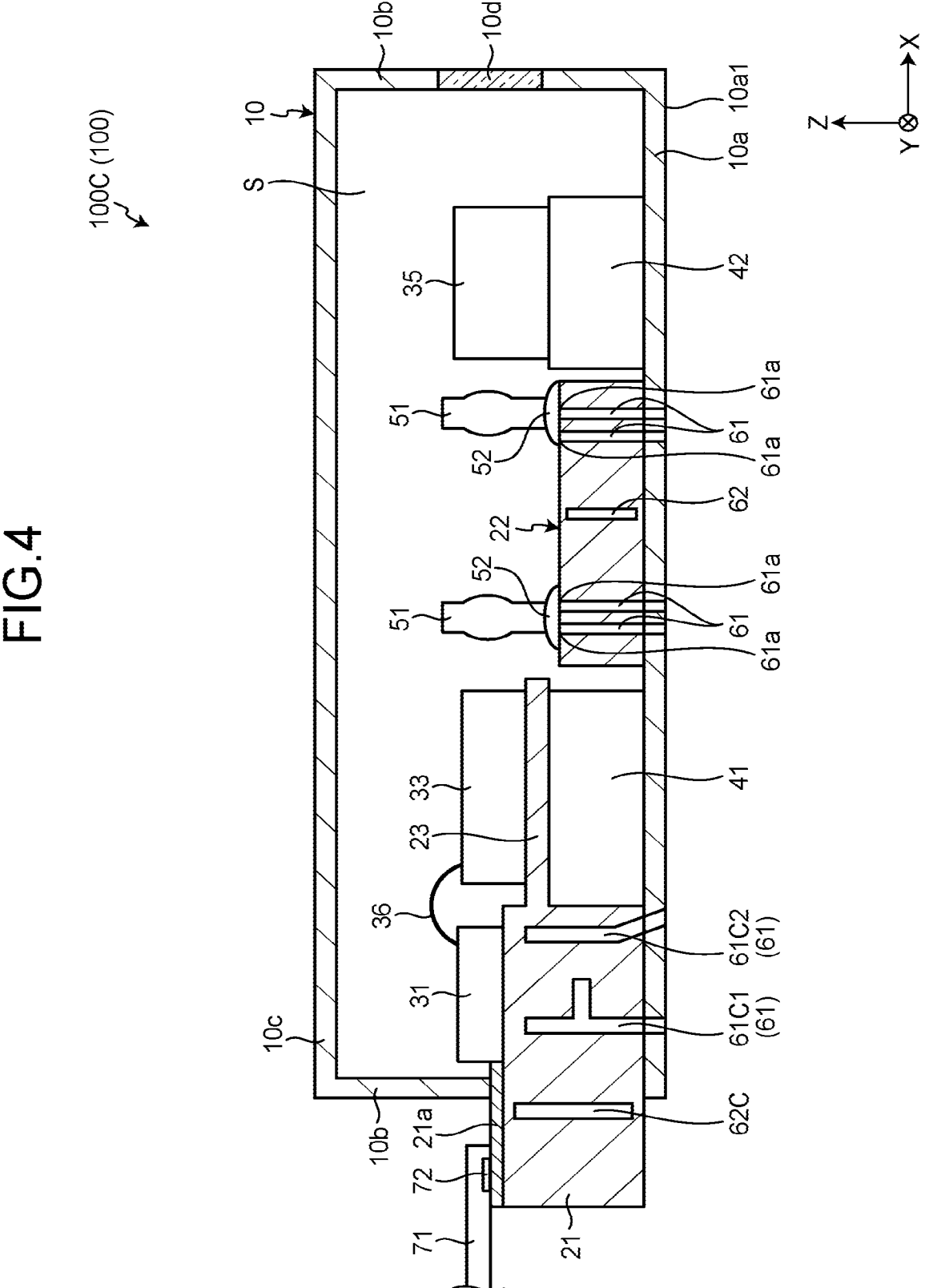
FIG. 4 is an exemplary and schematic side view (partial cross-sectional view) illustrating an internal configuration of an optical module according to a third embodiment.

FIG. 4 is a side view illustrating an internal configuration of an optical module 100C (100) according to a third embodiment. Even in the present embodiment, similarly to the first embodiment as described above, the hollows 61 and 62 are arranged in the feedthrough 21, the support base 22, and the bottom wall 10*a*. Even in the present embodiment, it is possible to achieve the same effects based on the same configuration as the first embodiment.

However, in the present embodiment, a part of the hollows 61 (hollow 61C1 or 61C2) is bent or includes a branch. With this configuration, for example, it becomes possible to arrange the hollows 61 at positions at which temperature is more easily increased and improve heat dissipation from the hollows 61 or it is possible to improve the degree of freedom of the wiring path, which is advantageous. Meanwhile, the hollow 62 may be bent or include a branch.

Furthermore, in the present embodiment, the conductor 21$a$ of the feedthrough 21 and a conductor of an external wire 71 are mechanically and electrically bonded to each other via a bonding portion 72. The bonding portion 72 may be, for example, a certain bonding portion, such as a soldered portion or a welded portion, which is heated to be melted and then cooled to be solidified at the time of bonding, and has conductivity.

Moreover, a hollow 62C as a closed space is arranged in the feedthrough 21 at a position outside the casing 10. With the hollow 62C, it is possible to prevent, at the time of bonding the bonding portion 72, heat transmission from the heated bonding portion 72 to the component, such as the modulator driver 31, in the storage space S (in the casing 10) via the feedthrough 21. Here, it is preferable that the hollow 62C is arranged as the closed space and is not opened to the outside of the feedthrough 21. If the hollow 62C is opened to the outside of the feedthrough 21, heat dissipation from a peripheral portion of the hollow 62C is increased, so that it may become difficult to fully apply heat for melting at the time of bonding the bonding portion 72.

Figure 5:
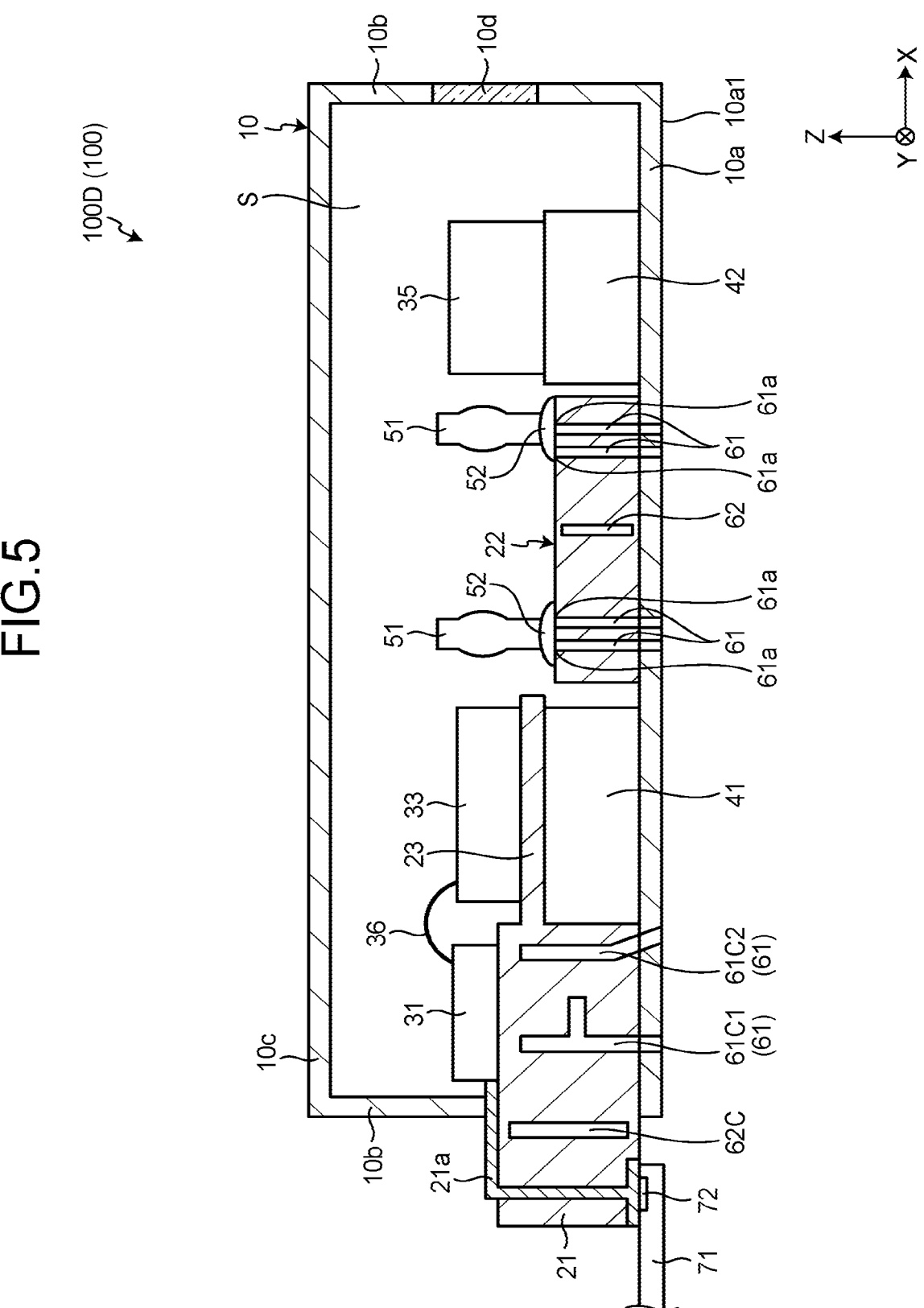
FIG. 5 is an exemplary and schematic side view (partial cross-sectional view) illustrating an internal configuration of an optical module according to a fourth embodiment.

FIG. 5 is a side view illustrating an internal configuration of an optical module 100D (100) according to a fourth embodiment. The optical module 100D of the present embodiment has the same configuration as the optical module 100C of the third embodiment as described above except that the conductor 21$a$ of the feedthrough 21 penetrates through the feedthrough 21 in the Z-direction. Even in the present embodiment, it is possible to achieve the same effects based on the same configuration as the third embodiment as described above.

Figure 6:
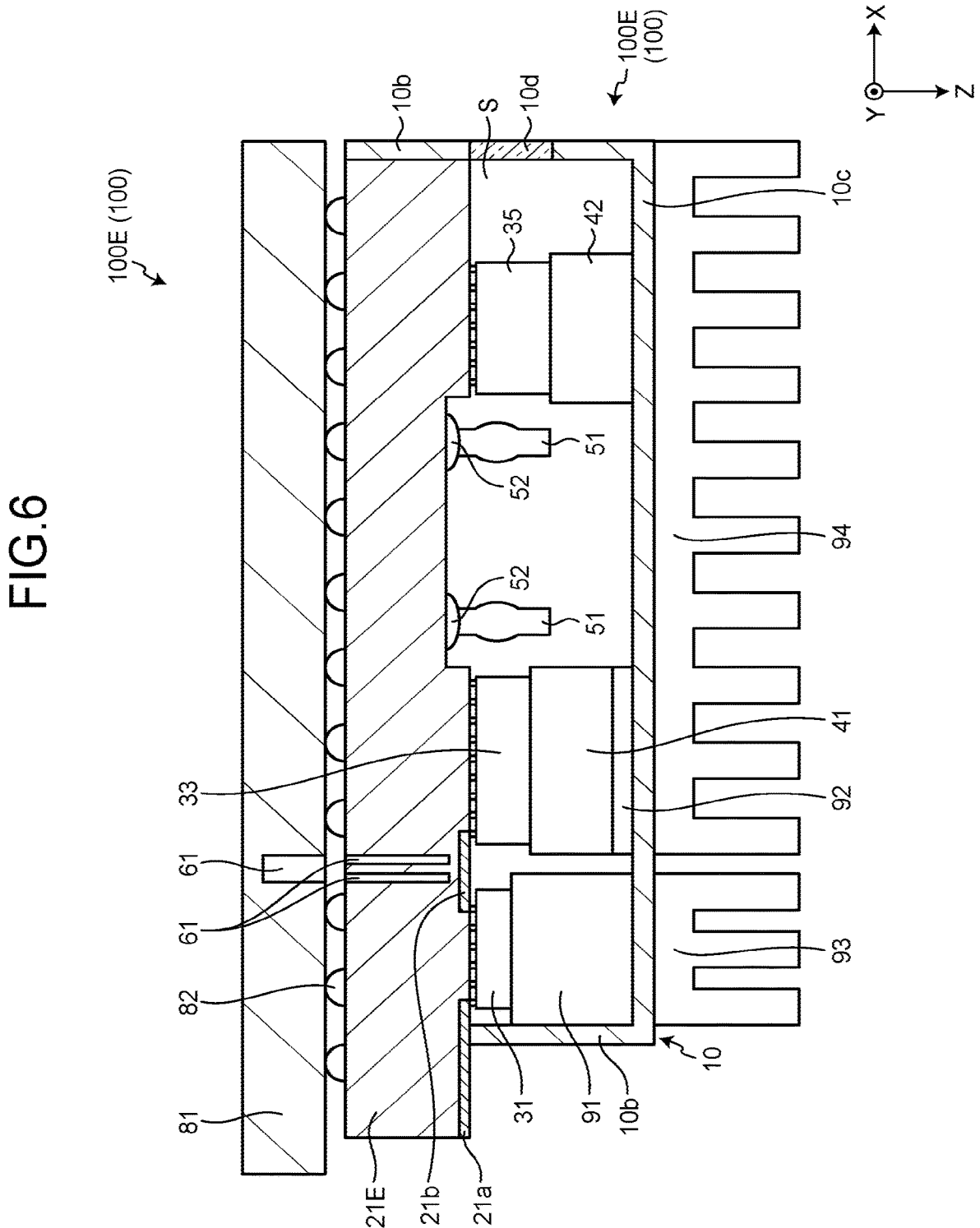
FIG. 6 is an exemplary and schematic side view (partial cross-sectional view) illustrating an internal configuration of an optical module according to a fifth embodiment.

FIG. 6 is a side view illustrating an internal configuration of an optical module 100E (100) according to a fifth embodiment. Even in the present embodiment, it is possible to achieve the same effects based on the same configuration as the first embodiment as described above.

However, the optical module 100E of the present embodiment includes a feedthrough 21E instead of the bottom wall of the casing 10. In other words, the feedthrough 21E functions as the bottom wall of the casing 10. The feedthrough 21E is configured as a multilayer wiring board.

The modulator driver 31, the transimpedance amplifier 32, and the first devices, such as the modulator 33, the coherent mixer 34, and the chip on submount 35, are mounted on the feedthrough 21E in a flip-chip manner and supported by the feedthrough 21E. The optical components, such as the lenses 51, are fixed to the feedthrough 21E via the adhesive 52. The feedthrough 21E is one example of the first member and one example of the support member.

A conductor 21$b$ that electrically connects a plurality of electrical components are arranged in the feedthrough 21E.

The modulator driver 31, the transimpedance amplifier 32, the first devices, and the top wall 10$c$ of the casing 10 are thermally connected to one another via a heat transfer member, such as a heat conductive block 91 that is relatively rigid or a heat conductive sheet 92 that is relatively soft. The heat transfer member may be configured by the single heat conductive block 91 or the single heat conductive sheet 92, or may be configured by a combination of the heat conductive block 91 and the heat conductive sheet 92. Furthermore, heat dissipation members, such as heat sinks 93 and 94, are fixed to the top wall 10$c$ so as to be exposed to the outside of the casing 10. With this configuration, it is possible to prevent an increase in the temperature of the first devices.

An insulating portion (general portion) of the feedthrough 21E may be made of a porous material, such as machinable ceramics. In this case, it is possible to further reduce a heat transfer coefficient of the feedthrough 21E itself, so that it is possible to prevent heat transmission in a heat transfer path of the feedthrough 21E.

Furthermore, the feedthrough 21E (the optical module 100E) is electrically and mechanically connected and fixed to a conductor of a mounting substrate 81 via a bonding portion 82, such as a solder ball. The mounting substrate 81 is one example of the fixing member. Moreover, the mounting substrate 81 is thermally connected to the feedthrough 21E and thermally connected to the heating parts and the first devices via the feedthrough 21E. Therefore, the mounting substrate 81 is one example of the first member and one example of the fixing member.

Furthermore, in the present embodiment, the hollows 61 are arranged in a heat transfer path of the feedthrough 21E and the mounting substrate 81 that are the first members that are thermally connected to the heating parts and the first devices. Therefore, according to the present embodiment, it is possible to prevent, by the hollows 61, heat transmission from the heating parts to the first devices, so that it is possible to prevent a change of the characteristics of light that is propagated inside the casing 10 and an eventual change of the optical characteristics of the optical module 100 due to the heat generated by the heating parts.

Figure 7:
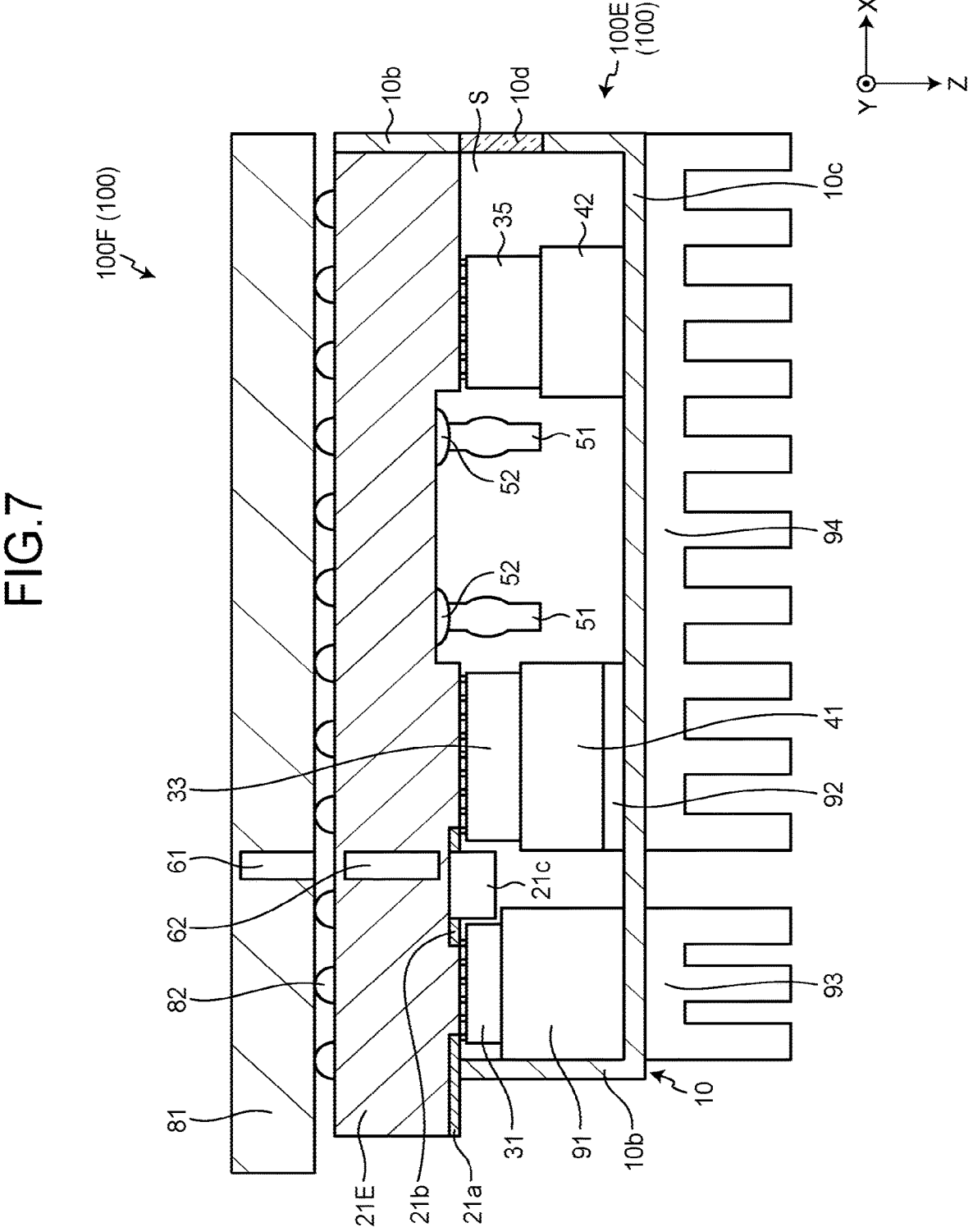
FIG. 7 is an exemplary and schematic side view (partial cross-sectional view) illustrating an internal configuration of an optical module according to a sixth embodiment.

FIG. 7 is a side view illustrating an internal configuration of an optical module 100F (100) according to a sixth embodiment. The optical module 100F of the present embodiment has the same configuration as the optical module 100E of the fifth embodiment as described above except that a cover conductor 21$c$ that covers the conductors 21$b$ with a gap is provided. Even in the present embodiment, it is possible to achieve the same effects as the fifth embodiment.

Furthermore, the hollow 62 as the closed space is arranged in the feedthrough 21E instead of the hollow 61. Meanwhile, the hollow 62 may also be arranged in the mounting substrate 81.

Figure 8:
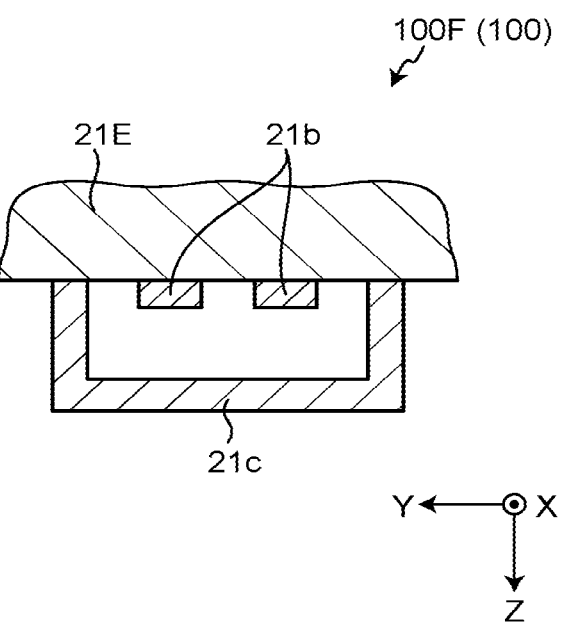
FIG. 8 is an exemplary and schematic partial cross-sectional view of the optical module according to the sixth embodiment.

FIG. 8 is a cross-sectional view crosses the X-direction and illustrating a portion in which the conductors 21$b$ and the cover conductor 21$c$ are arranged. As illustrated in FIG. 8, the cover conductor 21$c$ is a bent plate-like member, has an approximately U-shaped cross section, extends in the X-direction, is arranged so as to partially cover the conductors 21$b$, to which a signal is to be transferred, on the opposite side of the feedthrough 21E with respect to the conductors 21$b$, and is electrically connected to a ground conductor (not illustrated). With this configuration, it is possible to achieve impedance matching in the conductors 21$b$, so that it is possible to prevent a transmission loss of a signal that passes through the conductors 21$b$. Meanwhile, the cover conductor 21$c$ is not limited to the plate-like member, but may be a wire, a mesh, or the like.

Figure 9:
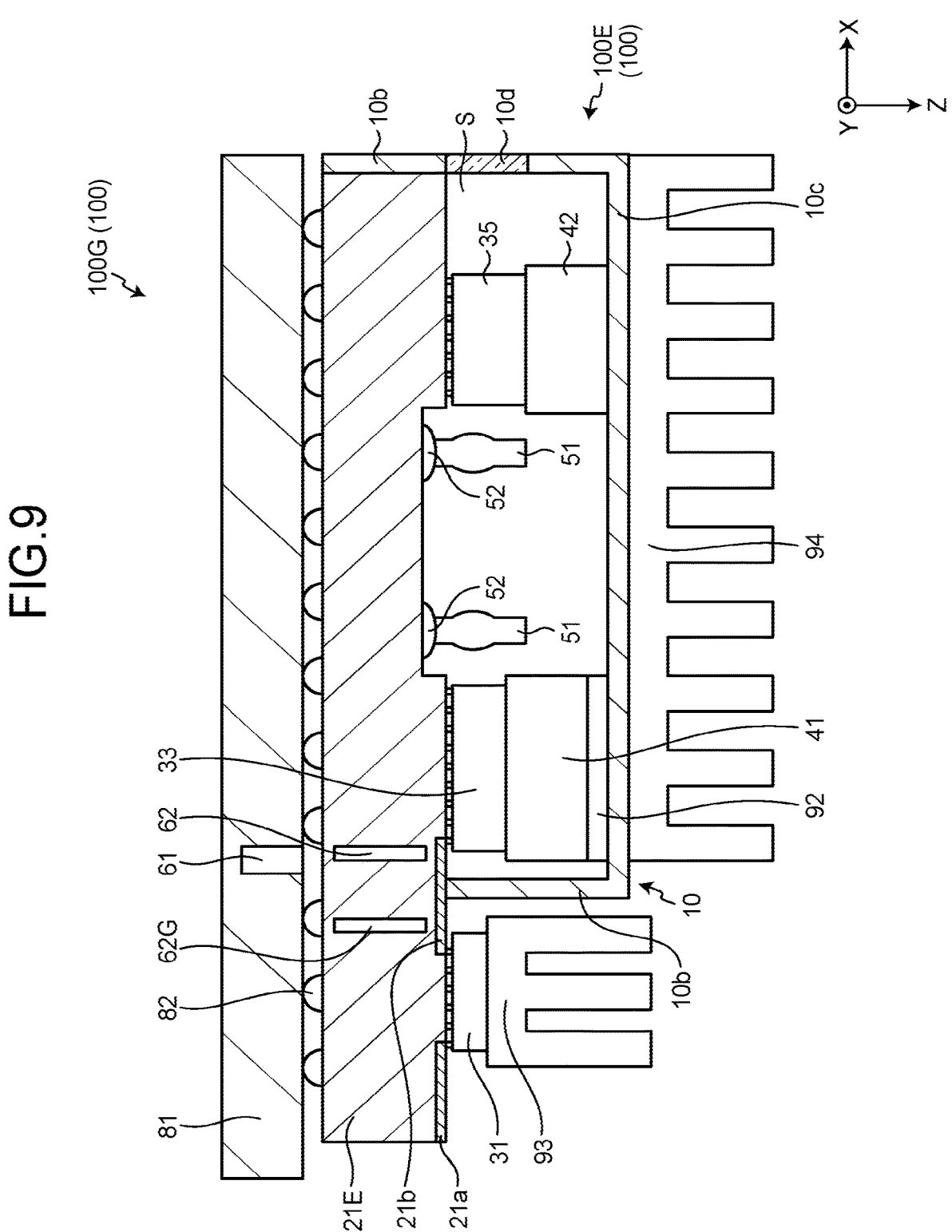
FIG. 9 is an exemplary and schematic side view (partial cross-sectional view) illustrating an internal configuration of an optical module according to a seventh embodiment.

FIG. 9 is a side view illustrating an internal configuration of an optical module 100G (100) according to a seventh embodiment. The optical module 100G of the present embodiment has the same configuration as the optical module 100F of the sixth embodiment except that the modulator driver 31 and the transimpedance amplifier 32 are arranged outside the casing 10. Even in the present embodiment, it is possible to achieve the same effects as the sixth embodiment.

In the present embodiment, the modulator driver 31 and the transimpedance amplifier 32 serving as the heating parts are located outside the casing 10. With this configuration, as compared to the configuration in which the heating parts are arranged inside the storage space S (inside the casing 10), heat generated by the heating parts are less likely to be transferred to the first devices, so that it is possible to further prevent a change of the characteristics of light that is transmitted inside the casing 10 and an eventual change of the optical characteristics of the optical module 100G due to the heat generated by the heating parts.

Furthermore, a hollow 62G is arranged in the feedthrough 21E at a position outside the casing 10. The hollow 62G is arranged in a heat transfer path from the modulator driver 31 or the transimpedance amplifier 32 serving as the heating part to the first devices, and is able to prevent heat transmission from the heating part to the first devices; therefore, even by the hollow 62G, it is possible to further prevent a change of the characteristics of light that is transmitted inside the casing 10 and an eventual change of the optical characteristics of the optical module 100G due to the heat generated by the heating part.

Thus, while the embodiments have been described above, the embodiments are mere examples, and do not limit the scope of the disclosure. The embodiments as described above may be embodied in various different forms, and various omission, replacement, combinations, and changes may be made within the scope not departing from the gist of the disclosure. Furthermore, specifications (a structure, a type, an orientation, a model, a size, a length, a width, a thickness, a height, a number, arrangement, a position, a material, and the like) of each of the configurations, the shapes, and the like may be changed appropriately.

For example, the cross-sectional shape of each of the hollows is not limited to a quadrilateral shape, but may be various shapes, such as an ellipse, a circle, a triangle, a trapezoid, or a V-shape.

According to the present disclosure, for example, it is possible to implement an optical module with an improved and novel configuration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical module comprising:
a casing in which light is propagated;
a heating portion;
a device arranged inside the casing and configured to change, when heated, characteristics of the light propagated inside the casing; and
a first member thermally connected to the heating portion and the device, the first member including
a hollow arranged in a heat transfer path from the heating portion to the device and configured to prevent convective heat transmission to an inside of the casing, wherein the hollow is a closed space.

2. The optical module according to claim 1, wherein the casing is hermetically sealed.

3. The optical module according to claim 1, wherein the hollow is opened to an outside of the casing.

4. The optical module according to claim 1, wherein the hollow has an opening portion toward the inside of the casing, and
the optical module further comprises a cover configured to at least partially cover the opening portion.

5. The optical module according to claim 4, wherein the cover is at least one of: a second member bonded to the first member; and adhesive configured to bond the first member and the second member.

6. The optical module according to claim 1, wherein the hollow is at least partially located inside the casing.

7. The optical module according to claim 1, wherein the hollow is located outside the casing.

8. The optical module according to claim 1, wherein
the heating portion and the device are arranged at an interval in a first direction, and
the hollow includes a plurality of hollows arranged at intervals in the first direction.

9. The optical module according to claim 1, wherein
the heating portion and the device are arranged at an interval in a first direction, and
the hollow includes a plurality of hollows arranged at intervals in a second direction that crosses the first direction.

10. The optical module according to claim 1, wherein the hollow includes a heat transfer layer having higher thermal conductivity than the first member, the heat transfer layer being arranged on an inner surface of the hollow.

11. The optical module according to claim 1, wherein
the device includes a plurality of devices, and
the hollow is located in a heat transfer path between the plurality of devices.

12. The optical module according to claim 1, wherein the heating portion is located inside the casing.

13. The optical module according to claim 1, wherein the heating portion is located outside the casing.

14. The optical module according to claim 1, wherein the heating portion is configured to operate electrically.

15. The optical module according to claim 14, wherein the heating portion is mounted on the first member in a flip-chip manner.

16. The optical module according to claim 1, further comprising:
a bonding portion for a plurality of members, the bonding portion being heated at a time of bonding.

17. The optical module according to claim 16, wherein the bonding portion is arranged outside the casing, and
the hollow is a closed space and located outside the casing.

18. The optical module according to claim 1, wherein the casing is configured to serve as the first member.

19. The optical module according to claim 1, wherein the first member includes a support configured to support the device.

20. The optical module according to claim 19, wherein the first member includes a fixing member fixed to the support member.

21. An optical module comprising:
a casing in which light is propagated;
a heating portion;
a device arranged inside the casing and configured to change, when heated, characteristics of the light propagated inside the casing; and
a first member thermally connected to the heating portion and the device, the first member including
a hollow arranged in a heat transfer path from the heating portion to the device and configured to prevent convective heat transmission to an inside of the casing,
wherein the hollow is located outside the casing.

22. An optical module comprising:
a casing in which light is propagated;

a heating portion;

a device arranged inside the casing and configured to change, when heated, characteristics of the light propagated inside the casing; and a first member thermally connected to the heating portion and the device, the first member including a hollow arranged in a heat transfer path from the heating portion to the device and configured to prevent convective heat transmission to an inside of the casing, wherein the heating portion is located outside the casing.

23. An optical module comprising:

a casing in which light is propagated;

a heating portion;

a device arranged inside the casing and configured to change, when heated, characteristics of the light propagated inside the casing;

a first member thermally connected to the heating portion and the device, the first member including a hollow arranged in a heat transfer path from the heating portion to the device and configured to prevent convective heat transmission to an inside of the casing; and a bonding portion for a plurality of members, the bonding portion being heated at a time of bonding, wherein:

the bonding portion is arranged outside the casing, and the hollow is a closed space and located outside the casing.

24. An optical module comprising:

a casing in which light is propagated;

a heating portion;

a device arranged inside the casing and configured to change, when heated, characteristics of the light propagated inside the casing; and a first member provided in contact with an inner surface of the casing and thermally connected to the heating portion and the device, the first member including a hollow arranged in a heat transfer path from the heating portion to the device and configured to prevent convective heat transmission to an inside of the casing, wherein a heat transfer path is formed from the heating portion to the device via the casing and the first member, and the hollow extends from the first member to the casing and is opened to an outside of the casing so as to suppress heat transfer from the heating portion to the device.

\* \* \* \* \*